(12) United States Patent
Xiang

(10) Patent No.: US 8,490,396 B2
(45) Date of Patent: Jul. 23, 2013

(54) CONFIGURATION AND TRACKING OF 2-D "MODULAR HELIOSTAT"

(75) Inventor: Xiao-Dong Xiang, Danville, CA (US)

(73) Assignee: e-Cube Energy Technologies, Ltd., Saratoga, CA (US)

( * ) Notice: Subject to any disclaimer, the term of this patent is extended or adjusted under 35 U.S.C. 154(b) by 707 days.

(21) Appl. No.: 12/563,982

(22) Filed: Sep. 21, 2009

(65) Prior Publication Data
US 2011/0079215 A1   Apr. 7, 2011

Related U.S. Application Data

(60) Provisional application No. 61/192,767, filed on Sep. 22, 2008, provisional application No. 61/110,752, filed on Nov. 3, 2008.

(51) Int. Cl.
*F03G 6/00* (2006.01)
*F24J 2/38* (2006.01)

(52) U.S. Cl.
USPC ............ 60/641.11; 60/641.15; 126/573; 126/576

(58) Field of Classification Search
USPC .......... 60/641.8, 641.11, 641.15; 126/573, 126/576, 574
See application file for complete search history.

(56) References Cited

U.S. PATENT DOCUMENTS

| | | | |
|---|---|---|---|
| 4,172,443 A | 10/1979 | Sommer | |
| 4,245,616 A * | 1/1981 | Wyland | 126/579 |
| 4,285,667 A | 8/1981 | Schmidt | |
| 4,317,031 A * | 2/1982 | Findell | 250/203.4 |
| 4,323,052 A * | 4/1982 | Stark | 126/571 |
| 4,333,446 A | 6/1982 | Smyth | |
| 5,325,844 A | 7/1994 | Rogers et al. | |
| 6,302,099 B1 | 10/2001 | Mcdermott | |
| 6,979,911 B2 | 12/2005 | Otting et al. | |
| 7,677,241 B2 * | 3/2010 | Hickerson | 126/600 |
| 8,087,245 B2 * | 1/2012 | Quero et al. | 60/641.15 |
| 8,104,465 B2 * | 1/2012 | Kribus et al. | 126/569 |
| 2007/0070531 A1 | 3/2007 | Lu | |
| 2007/0227574 A1 | 10/2007 | Cart | |

FOREIGN PATENT DOCUMENTS

| | | |
|---|---|---|
| CN | 1963591 A | 5/2007 |
| WO | WO 00/63625 | 10/2000 |
| WO | WO 2006/120475 | 11/2006 |
| WO | WO 2007/045917 | 4/2007 |
| WO | WO 2010/033952 | 3/2010 |
| WO | WO 2010/034038 | 3/2010 |

OTHER PUBLICATIONS

PCT International Search Report and Written Opinion dated Nov. 10, 2009 issued in PCT/US2009/057742 (WO 2010/033952).

(Continued)

*Primary Examiner* — Hoang Nguyen

(74) *Attorney, Agent, or Firm* — Tom Hunter; Weaver Austin Villeneuve & Sampson LLP

(57) ABSTRACT

A system and method of collecting solar energy from sunlight, employing a thermal generation apparatus having a solar collector module including a receiver in optical communication with an array of mirrors. The method comprises reflecting energy impinging upon the reflector assembly with a plurality of reflective elements. The plurality of reflective elements is configured to direct energy reflected therefrom onto the receiver. The solar collector module is configured to rotate about an axis; and an angular position of the plurality of reflective elements is changed in relation to relative movement of the sun with respect to earth.

27 Claims, 4 Drawing Sheets

OTHER PUBLICATIONS

PCT International Preliminary Report on Patentability dated Mar. 22, 2011 issued in PCT/US2009/057742 (WO 2010/033952).
PCT International Search Report and Written Opinion dated May 13, 2010 issued in PCT/US2009/065415 (WO 2010/034038).
PCT International Preliminary Report on Patentability dated Mar. 22, 2011 issued in PCT/US2009/065415 (WO 2010/034038).
Chinese Office Action dated Jul. 16, 2012 issued in CN 200980145771.7 [with English Translation].
Israeli Office Action dated Oct. 30, 2012 issued in IL 211868 [English Translation].

* cited by examiner

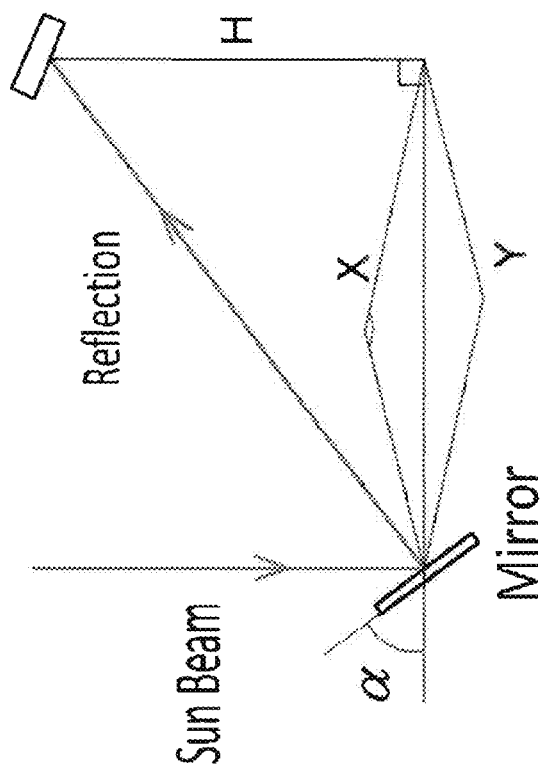

CONFIGURATION AND TRACKING OF 2-D "MODULAR HELIOSTAT"

CROSS-REFERENCE TO RELATED PATENT APPLICATIONS

This patent application claims priority to U.S. Provisional patent application No. 61/192,767 filed 22 Sep. 2008, entitled CONFIGURATION AND TRACKING OF 2-D "MODULAR HELIOSTAT" and naming Xiaodong Xiang as inventor and Provisional patent application No. 61/110,752 filed 3 Nov. 2008, entitled CONFIGURATION AND TRACKING OF 2-D MODULAR HELIOSTAT and naming Xiao-Dong Xiang as inventor, the entire content of each being hereby incorporated by reference.

FIELD OF THE INVENTION

The present invention relates generally, to solar concentrators, and more specifically to a collecting solar energy while compensating for movements of a source of energy.

BACKGROUND OF THE INVENTION

Solar power has been viewed by many as a highly desirable energy resource, because it may be readily used to generate thermal and electrical energy. For example, a solar collector (usually formed by mirrors) may collect optical energy from the sun and direct the same to a transducer (receiver), which may convert the optical energy to either to thermal energy or electricity. The thermal energy is usually transport out (or between) of transducers to applicator via "heat transfer fluid" (HTF), e.g., such as water, oil and the like. By arranging solar collectors in arrays, power plants have been developed that may convert vast amounts of solar energy to energy used for desired applications.

In solar thermal applications, optical energy from the sun is converted to thermal energy for use in other applications, such as generating electrical energy employing known implements such as conventional turbine-electric generators or a Sterling Engine, or for cooling or heating. To that end, typically large arrays of individual solar modules (composed of optical collectors and thermal receivers i.e., the device for receiving, absorbing optical energy and converting it to thermal energy) are coupled by fluid pipes and transfer heat with HTF. Each module has a fixed power conversion and transfer capacity, i.e., that quantity of solar energy that may be collected and transferred to the thermal transfer fluid.

In such applications, thermal loss limits the overall conversion efficiency. Thermal loss is dominated by convection loss and "black-body radiation" loss (BRL). While convection loss can be reduced by thermally insulating the thermal receiver and HTF transfer pipes. However, (BRL) of the receiver is difficult to control. BRL is dependent upon receiver aperture area, temperature, and the material of the absorption surface of the collector. Specifically, BRL is linearly proportional to the receiving/radiating aperture area and to the $4^{th}$ power of the temperature of the radiating body. In order to reduce BRL, and consequently, increase the overall conversion efficiency, it is desired to reduce the receiver area. One manner in which to reduce BRL while minimizing the inefficiency of the collector module is to employ a solar collector with a concentrator with a high concentration ratio, i.e., high solar collector area to thermal receiver area ratio.

For solar concentrators to work, solar trackers are required. Solar trackers follow the changes in relative position of the Sun in order to accomplish the concentration or focusing the Sun's radiation onto the thermal receiver aperture. Sun's movement is often described in two angular movements: "Hour Angle", and also "Seasonal Angle" or "Declination Angle". The Hour Angle describes the angular position of the Sun relative to an earth surface location due to Earth self-rotational daily periodic movement (i.e., Earth Spin); while the Declination (Seasonal) Angle describes the angular position of the Sun relative to an earth surface location due to the periodic movement of Earth-Sun rotational Axis relative to Earth Self-Spin Axis.

Traditionally, tracking of the movement of the sun is often done by rotating the entire optics-solar collector panel together with a solar receiver assembly in two axes, often called "moving target" tracking system. However, many of these solar concentrators comprise a single optical element per solar receiver resulting in a heavy system that must be rotated. As a result, tracking systems are typically expensive due to mechanics required provide the torque and acceleration desired to provide the desired movement.

Other solar concentrators comprise an array of optical element per solar receiver, individually moving to focus the Sun beam on a fixed solar receiver or target, usually called "heliostat" or "fixed target" system. In such configuration, for each optical element, the concentration ratio is either 1 or slightly higher than 1; however, many such optical elements project the sun light onto the same solar collector, and therefore resulting very high concentration ratio. Each such optical element has a different relative position and angle relative to the target, collectively forming a "Fresnel reflector", i.e. arrays of small flat (or basically flat) mirrors forming a concave surface on a flat back plate. The optical cosine loss is large in such system (~25%) since the Sun beam is not vertical to the reflecting mirrors in general. A heliostat of M×N optical elements usually require 2×M×N of independent moving axes (and therefore motors) to maintain focus (tracking) on a fixed target as Sun moves during the day and seasons, which is very expensive to implement.

A need exists, therefore, for improved techniques for tracking of the sun.

SUMMARY OF THE INVENTION

The present invention is directed to a system and method of collecting solar energy from the Sun employing a thermal generation apparatus having a solar collector module including plurality of mirrors (or reflective optics), forming a Fresnel Reflector assembly, to focus the Sun light onto a thermal receiver. In one embodiment, a solar collector module includes a panel frame, an array of mirrors forming a Fresnel Reflector (or Heliostat) mounted on the panel frame, and a thermal receiver, also fixed on the panel frame. The panel frame together with all mirrors and thermal receiver is rotated about an axis, which can be oriented South-North direction with a tilt angle equal to the latitude angle at the location, to compensate for Sun's Hour Angle movement during each day through a "moving target" tracking scheme. Each individual row of mirrors is mounted on a rotation axis, which is approximately perpendicular to a panel rotating axis, supported by pivotal supports on the frame. All rows of mirror and their rotation axes rotate by a approximately a same angle relative to the panel frame plane, that is approximately half of the Declination Angle to compensate for Seasonal adjustment of the Sun during the year through a "fixed target" scheme. Using this "mixed tracking" scheme, this "Modular Heliostat" tracks Sun's movement and focuses the Sunlight to the thermal receiver.

In order to overcome the above discussed problems, we disclose here an inventive design of "Modular Heliostat" (MH). In one embodiment, MH is a 2-dimensional array (M×N) of optical elements and one of multiple solar collectors (receivers) assembled in a modular system defined by a frame and plane. There are M columns of mirrors along Y axis mounted on their rational axis (N number), which is parallel to the X axis of the plane. There are N rows of mirrors and rotational axes along X axis. A thermal (or solar) receiver for each modular system is fixed on the frame (by supporting structure) at approximately the center above the plane (with a height of H) facing down perpendicularly to the normal of the plane. The optical elements are mounted relative to the plane with initial angles that will allow the Sun light approximately normal to the plane to focus on the solar collector, forming 2-D Fresnel reflector array. At each mirror center position of (x, y), the initial angle is made to be approximately $\alpha=(\frac{1}{2})\tan-1((x^2+y^2)^{1/2}/H)$, and is measured between the plane of the frame and plane of the mirror facing the center point. The center of the mirror should be approximately the rotational center of the rotating axis, i.e. there is preferably no horizontal displacement of the mirror's center position during the mirror rotation.

This design adopts a mixed strategy of "moving target" and "fixed target" tracking schemes. Rotating the panel with a "moving target tracking schemes" around a "polar axis", which is oriented south-north direction and tilted with a angle relative to the earth horizontal plane equal to the "Latitude Angle", by the Sun's "Hour Angle" with an angular speed of 15 degree/hour, is adopted to align the module so that during the day, the Sun beam plane (with incoming and reflected beam ray refine the plane) is always normal to the panel (so that cosine loss is kept small) and the Sun beam plane is parallel to Y-Axis (perpendicular to the mirror rotation axis). As the Sun beam angle changes within this plane during the seasons by an angle away from the panel normal, all mirror axis's supported by pivotal supports fixed on the frame will be made to rotate an angle equal to half of "Declination Angle" value to approximately maintain the mirror array (Fresnel Reflector) focus point on the solar receiver or target. This tracking mechanism is effectively a "fixed target" tracking scheme. Although during this rotation, there could be small de-focus effect among all mirrors, with proper design (e.g. keep the receiver high enough relative to the width (X dimension) of the panel frame and receiver aperture large enough), this effect can kept relatively small to obtain a relatively high value of concentration much higher than that of 1-D system with similar optics (flat mirrors).

BRIEF DESCRIPTION OF THE DRAWINGS

FIG. 1B is a schematic diagram illustrating an initial angle for a mirror according to one embodiment of the present invention to form a Fresnel Reflector.

DETAILED DESCRIPTION OF THE PREFERRED EMBODIMENTS

In an embodiment, optical elements can be selected from variety of optics, such as flat mirror, concave mirror, reflectors, and other devices capable of reflecting the sunlight onto same or focusing the sunlight onto a smaller area of solar cell (or collector). Each optical element is supported by supporting base with a designed initial angle and fixed on a shaft with bearing support on the plane frame. A 2-dimensional array (M×N) of optical elements is assembled in a modular system defined by a frame and plane. There are M columns along Y-axis with their rational axis parallel to the X-axis of the plane and N rows of mirror along X-axis. In one embodiment, a receiver is fixed on the frame (by supporting structure) at the center above the plane (with a height of H) facing down perpendicularly to the normal of the plane. All Fresnel mirrors are fixed relative to the plane with initial angles that will allow the Sun light normal to the plane (at Solar noon on solar equinox, when the sun declination angle is equal to zero) to focus on the center of the receiver, forming 2-D Fresnel reflector array. At each mirror center position of (x, y), the initial angle of the mirror should be $$\alpha=(\frac{1}{2})\tan-1((x^2+y^2)^{1/2}/H)$$

and facing the center below the thermal receiver (X and Y, as used herein, denotes the position, along orthogonal axes, of the center of each mirror by its distance from a point p on the plane z, formed by the centers of the mirrors. This point p has the shortest distance among all point on plane z to the solar collector. As such, $(X^2+y^2)^{1/2}$ is the distance between the center of the each mirror to point p). Note that initial angles and mirror rotation axis angles should have a common rotation center. The center of the mirror should not have horizontal displacement during mirror rotation.

Figure 1A:
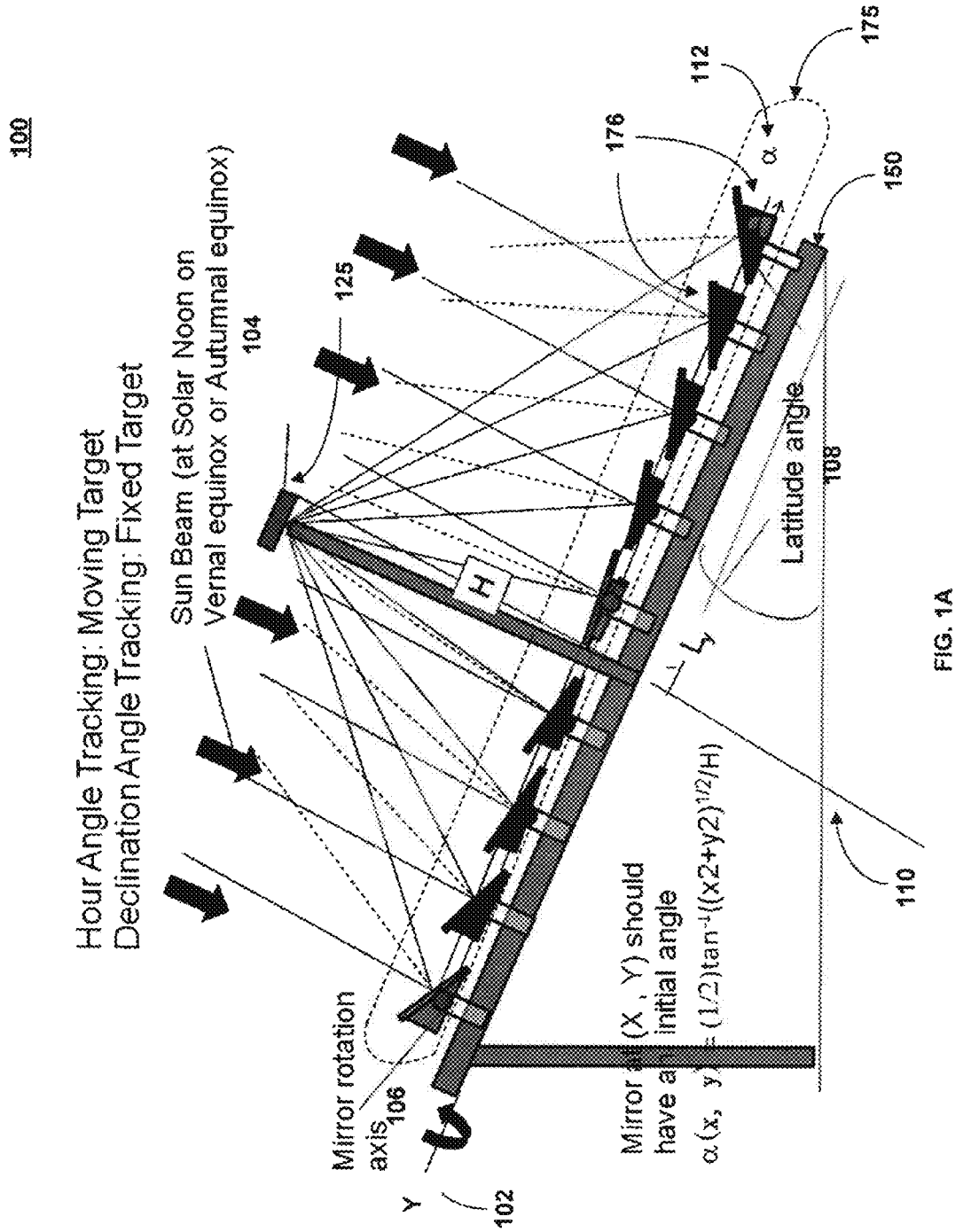
FIG. 1A is a schematic diagram showing a side view of a solar collector of a thermal generation apparatus according to one embodiment of the present invention.

FIG. 1A is a schematic diagram illustrating one embodiment showing a side view of a solar collector 100 of a thermal generation apparatus (not shown). In one embodiment, the solar collector 100 includes a receiver 125 and a panel frame 150 with an array of mirrors 175. The solar collector 100 can generate thermal energy from exposure to sunlight. The solar collector 100 can be attached to a base or a rooftop. In one example, multiple solar collectors can be implemented in a system.

The panel frame 150 is composed of a rigid material to support the array of mirrors 175 and allow rotation about an axis 102. The rotational axis beam 102 is positioned pointing south-north direction and tilted by a Latitude Angle (Ly) 108 from the horizontal ground plane. The receiver 125, in one embodiment, is rigidly attached to the panel frame 150.

The array of mirrors 175 can be a flat mirror arranged as a Fresnel lens. In one embodiment, there are M rows (e.g., rows 176) and N columns of flat mirrors that together comprise a large concave aperture. Each mirror in a row is positioned to have approximately an angle ($\alpha$) 112 relative to the panel frame 150 to allow focus reflected sunlight towards the receiver 125. As a result, successive rows have larger angles as a horizontal distance from the receiver 125 increases. Each row can rotate about an individual axis 106. One example of determining an initial value for angle 112 is illustrated in FIG. 1B. In one embodiment, initial angles for individual mirrors can be different.

Ultimately, the solar collector 110 is configured to collect a maximum amount of sunlight in the receiver 125. To receive an optimal amount of incoming sunlight, a plane of the panel frame 150 is positioned approximately normal to a plane of sunlight. The panel frame 150 is rotated about an axis (polar axis, i.e. the rotational axis beam 102 positioned pointing south-north direction and tilted by a Latitude Angle (Ly) 108 from the horizontal ground plane) to compensate for Hour Angle adjustments of sunlight (i.e., due to Earth's self-spin), N rows of mirrors are positioned to focus on a position of the receiver 125. All individual rows of mirrors are rotated about their axes by a half of the Declination Angle to compensate for seasonal adjustments of sunlight (i.e., due to relative angle movement of Earth self-spin axis and Earth-Sun rotation plane axis). Various combinations of these factors can be implemented for a particular solar collector 100, such as the exemplary combinations described below.

In a preferred embodiment, tracking scheme is a "mixed moving/fixed target tracking" scheme. As shown in FIG. 1A, the side-view of Y-axis 102 (in the middle of the panel) of 2-D Fresnel reflector mirror array assembly configuration, the Y-axis 102 of the assembly plane is titled by an angle equal to the latitude angle 108 of the location (e.g., the Latitude Angle for San Francisco, Calif. is about 37 degrees). To maintain the Sun incoming and reflected beams and normal line of the assembly plane always in the same plane, i.e. the Sun beam plane, which is parallel to Z-Y-plane (perpendicular to the mirror rotation axis), the panel frame 150 is rotated along Y-axis 102 during a day continuously by the Sun Hour Angle at a constant angular speed (e.g., 15 degrees/hour).

During the year, if the Sun at a position so that its beam form a declination angle with the normal plane perpendicular to the Y-axis 102, all M rotational column axes (parallel to X-axis) will be rotated by approximately half of the Declination Angle (in addition to their initial angles), to maintain an approximate focus on the receiver 125. Although during this rotation, there could be de-focus effect among all mirrors, with proper design (e.g. keeping the receiver 125 high relative to the width (dimension of x) of the panel frame 150, and large receiver aperture), this effect can be kept relatively small to obtain a relatively high value of concentration much higher than that of 1-D system with similar optics (flat mirrors). As a result, this embodiment of the solar collector 100 (a Modular Heliostat) only requires at most 2 moving axes (and motors) to track the Sun movement; one motor to track the seasonal declination of the sun (by rotating all mirror axes together through certain mechanical linkage mechanism)), and one motor to track the daily sun hour angle (e.g., at a rate of 15 degrees/hour). Typically, axis 102 and paper plane can be used to define a plane of sunlight on a vernal equinox (i.e., March 22) or autumnal equinox (i.e., September 22).

Using vector calculation, we obtain an exemplary formula for the de-focusing effect as following:

For a mirror at (x, y) position from the center (0, 0) where the target is directly located above the panel plane at height H, if declination angle is $\delta$, the focus errors (deviations from the target center) in x and y directions are:

$$\Delta_x = \frac{DN_{0x}}{\left[\begin{pmatrix} N_{0y}\sin\delta/2 + \\ N_{0z}\cos\delta/2 \end{pmatrix} - \frac{N_o\cos\delta}{2\left[\begin{array}{c} -\sin\delta\begin{pmatrix} N_{0y}\cos\delta/2 - \\ N_{0z}\sin\delta/2 \end{pmatrix} + \\ \cos\delta\begin{pmatrix} N_{0y}\sin\delta/2 + \\ N_{0z}\cos\delta/2 \end{pmatrix} \end{array}\right]}\right]}$$

$$\Delta_y = \frac{D\left[\begin{pmatrix} N_{0y}\cos\delta/2 - \\ N_{0z}\sin\delta/2 \end{pmatrix} + \frac{N_o\sin\delta}{2\left[\begin{array}{c} -\sin\delta\begin{pmatrix} N_{0y}\cos\delta/2 - \\ N_{0z}\sin\delta/2 \end{pmatrix} + \\ \cos\delta\begin{pmatrix} N_{0y}\sin\delta/2 + \\ N_{0z}\cos\delta/2 \end{pmatrix} \end{array}\right]}\right]}{\left[\begin{pmatrix} N_{0y}\sin\delta/2 + \\ N_{0z}\cos\delta/2 \end{pmatrix} - \frac{N_o\cos\theta}{2\left[\begin{array}{c} -\sin\delta\begin{pmatrix} N_{0y}\cos\delta/2 - \\ N_{0z}\sin\delta/2 \end{pmatrix} + \\ \cos\delta\begin{pmatrix} N_{0y}\sin\delta/2 + \\ N_{0z}\cos\delta/2 \end{pmatrix} \end{array}\right]}\right]}$$

Where $$N_{0x} = \frac{X}{2\cos\alpha\sqrt{X^2 + Y^2 + D^2}}$$

$$N_{0y} = \frac{Y}{2\cos\alpha\sqrt{X^2 + Y^2 + D^2}}$$

$$N_{0y} = \frac{Y}{2\cos\alpha\sqrt{X^2 + Y^2 + D^2}}$$

A computer (not shown) can include control software to manage automated rotation of the axes 106 and 102.

Figure 2:
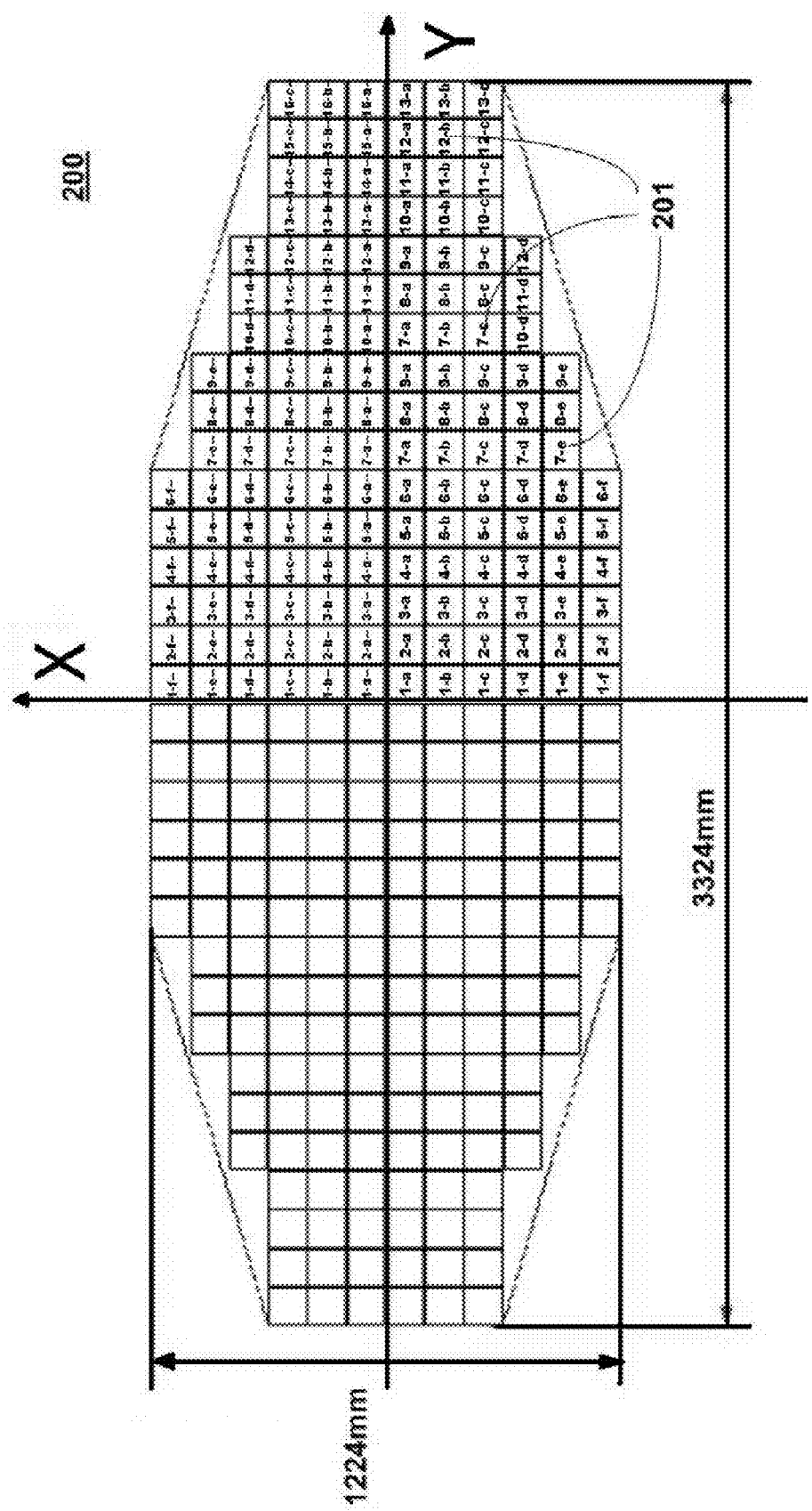
FIG. 2 is a schematic diagram showing a top view of a solar collector panel according to one embodiment of the present invention.

FIG. 2 is a schematic diagram illustrating one embodiment showing a top view of a panel 200 including an array of mirrors (e.g., mirrors 201) or other reflective elements. The panel 200 has an elongated shape such that a length of a center column (Y-axis) is greater than a width of a center row (X-axis). Furthermore, corners (e.g., corner 205) have been eliminated to remove mirrors that have larger focus errors, as described more fully below. Consequentially, the panel 200 has a higher concentration ratio. Each row of panel 200 is labeled with a common number, while each column is labeled with a common letter. Panel 200 is merely an example implementation as one of ordinary skill in the art would readily recognize variations within the scope of the present invention (e.g., the dimensions and shape). For example, an oval shaped frame and assembly can also be used to achieve high concentration ratio.

Figure 3:
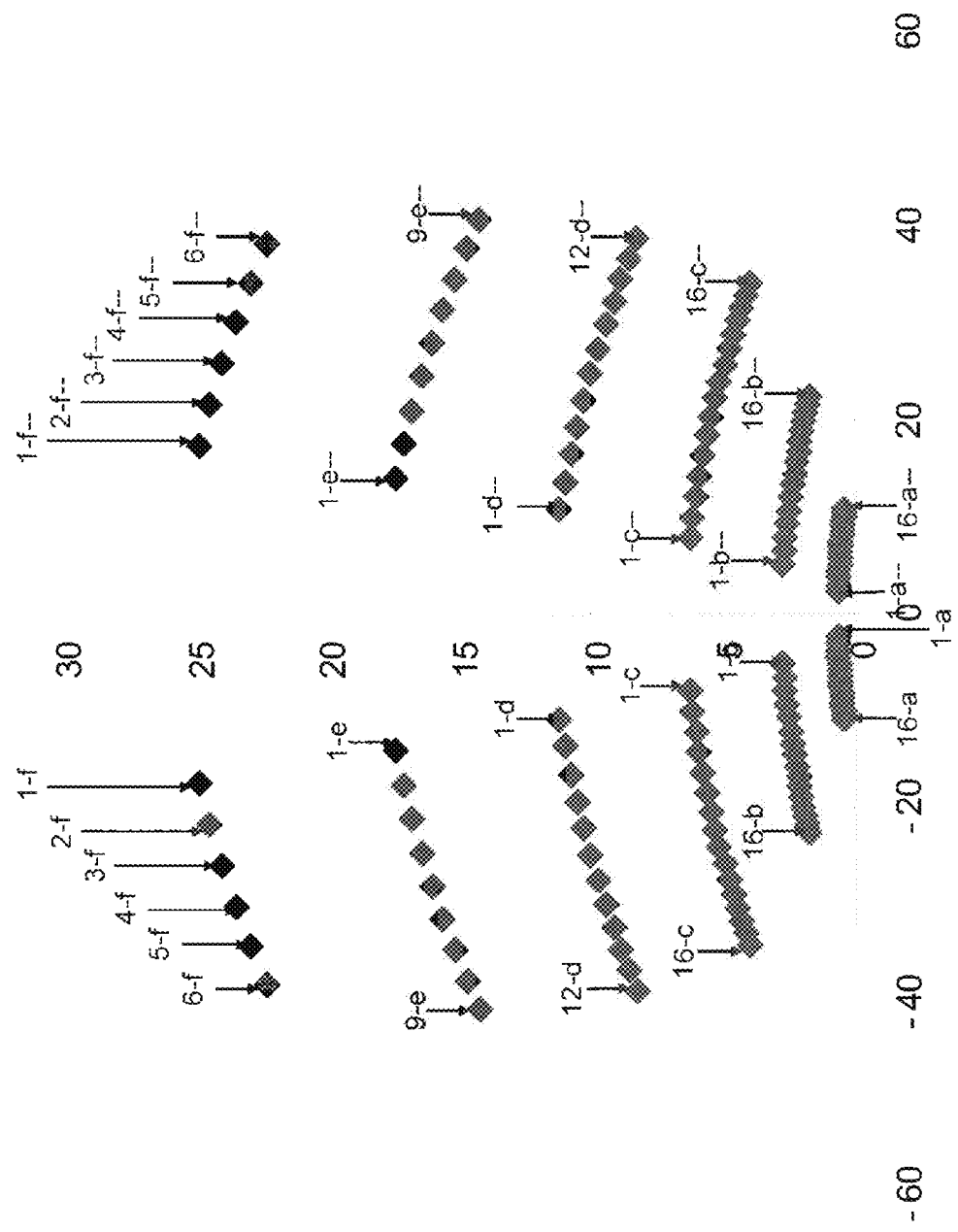
FIG. 3 is a table illustrating focus error according to one embodiment of the present invention.

FIG. 3 is a table 300 showing focus errors calculated for the panel 200 of FIG. 2. More specifically, the number and letter combination for each point on the table 300 maps to an individual mirror of the panel 200 of FIG. 2. Based on the calculations, we can design a preferred panel with 300 mirrors each with a dimension of 100 mm by 100 mm, and a target dimension of x=180 mm and y=150 mm. Such a configuration has a concentration ratio of about 110.

In the preferred, but non-limiting configuration, the solar collector 100 includes a metal made liquid container as a thermal receiver with incoming (lower) and outgoing (higher) connection pipes. A metal surface is preferably coated with selective coating that will effectively absorb most solar energy, but less effective to emission with infra-red wavelength corresponding to the temperature of the receiver body to reduce the thermal loss. In another embodiment, the receiver can be a Sterling Engine. Optical elements are silvered flat glass mirrors with a typical dimension of 10×10 cm. To accommodate the panel tracking, a small section of flexible tubing, or a sealed joint, is needed at the end of Y rotational axis. A thermal liquid can be either water or other thermal energy transfer media. A liquid storage tank (not shown) is equipped with capability to maintain the liquid level at the height of middle of the solar container during the seasonal tracking. With the solar heating, the liquid will be heated up and go through the piping to the central heat exchange station to generate high pressure steam for generation of electricity by conventional Turbine-electric generator, or Sterling Engine.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

The invention claimed is:

1. A solar collector to generate thermal energy, said solar collector comprising:
   a receiver to collect solar energy; and
   a panel that reflects solar energy towards the receiver, wherein said panel is comprised of a panel frame that supports an array of reflective optical elements that form a Fresnel reflector assembly comprising a plurality of rows and columns of said reflective optical elements, wherein:
      said array and frame are configured so that said frame is mounted on and rotates about a first axis and said rotation rotates substantially all of the optical elements comprising said array around said first axis; and
      rows of optical elements comprising said array are each mounted on and configured to rotate around a second axis substantially perpendicular to said first axis; and
   said receiver is attached to and fixed relative to the panel such that when the panel rotates around said first axis the receiver moves in a manner fixed with respect to said panel and
   wherein one motor and a first mechanical driving mechanism controls rotation of the frame of the panel, and one motor and a second mechanical driving mechanism controls rotation of the rows of reflective optics.

2. The solar collector of claim 1, wherein the center of each mirror in a row is at approximately the rotational center of the second rotating axis.

3. The solar collector of claim 1, wherein said second mechanical driving mechanism is configured so that each row rotates approximately the same amount.

4. The solar collector of claim 1, wherein said first rotational axis is oriented in a substantially south-north direction with a tilt angle relative to a horizontal plane of the earth equal to a local latitude angle, such that the first rotational axis is oriented parallel to the earth self-rotational axis.

5. The solar collector of claim 4, wherein the angle rotation around said first rotational axis is defined to be zero at the position when the panel frame plane is normal to sun light at solar noon when an hour angle is zero in an equinox day when a declination angle is approximately zero.

6. The solar collector of claim 3, wherein said first mechanical driving mechanism is configured to rotate the panel frame along said first axis during a day by the sun hour angle at a substantially constant angular speed.

7. The solar collector of claim 6, wherein said second mechanical driving mechanism is configured to rotate the rows comprising said array to correct for yearly change in declination angle.

8. The solar collector of claim 7, wherein the second mechanical driving mechanism is configured to rotate the rows by approximately half of the declination angle over the course of a year.

9. The solar collector of claim 3, wherein said first mechanical driving mechanism and/or said second mechanical driving mechanism is under computer control.

10. The solar collector of claim 9, wherein said computer is configured to implement a mixed moving fixed target tracking scheme.

11. The solar collector of claim 3, wherein each optical element comprising said array is fixed on a shaft comprising said second axis of rotation and configured at an initial angle that allows sunlight normal to the plane of said panel at solar noon on solar equinox, when the sun declination angle is equal to zero to focus substantially on the center of the receiver.

12. The solar collector of claim 11, wherein each optical element comprising said array is supported by supporting base at said designed initial angle that is fixed on said shaft with bearing support on the plane frame.

13. The solar collector of claim 3, wherein said receiver is substantially centered above said array such that the receiving face of said receiver is directed downwards to face said array.

14. The solar collector of claim 3, wherein said optical elements comprise mirrors.

15. The solar collector of claim 14, wherein said optical elements comprise flat mirrors.

16. The solar collector of claim 14, wherein said optical elements comprise concave mirrors.

17. The solar collector of claim 14, wherein said optical elements comprise parabolic mirrors.

18. The solar collector of claim 3, wherein the length of a center column of said array is greater than the width of a center row of said array.

19. The solar collector of claim 18, wherein reflective elements comprising corners of said array are not present.

20. The solar collector of claim 18, wherein the receiver is centered relative to the panel and the panel forms diagonal corners such that a predetermined number of mirrors having the greatest distance from and the center are eliminated to increase the concentration ratio of reflected solar energy.

21. The solar collector of claim 18, wherein the frame of said array is substantially ovoid.

22. The solar collector of claim 3, wherein said receiver comprises a cavity formed by spiral metal tubing with heat transfer fluid that conducts thermal energy out of the receiver.

23. The solar collector of claim 3, wherein said receiver comprises a metal surface coated with a coating that absorbs most solar energy, but is less effective to emit infra-red wavelength energy corresponding to the temperature of the receiver body.

24. The solar collector of claim 3, wherein the receiver comprises a Sterling Engine.

25. The solar collector of claim 3, wherein said receiver is configured to generate steam.

26. A method of generating thermal energy, said method comprising:
   collecting solar energy with a solar collector of claim 1, wherein said collecting comprises:
   rotating said panel frame around said first axis to a first angle to maintain exposure of the array of reflective optics and the receiver to the sun; and
   optionally rotating the rows of reflective optics around a plurality of second axes perpendicular to the first axis to a second angle to maintain exposure of the array of reflective optics and received to the sun.

27. The method of claim 26, further comprising receiving heat transfer fluid or steam from said receiver to provide a source of thermal energy.

\* \* \* \* \*